(12) United States Patent
Maschio (10) Patent No.: US 6,378,183 B1
(45) Date of Patent: Apr. 30, 2002

(54) SYSTEM AND METHOD FOR MAKING CISTERNS

(76) Inventor: Pietro Maschio, Via Lazio, 16, 20056 Grezzago, (Milan)- (IT)

( * ) Notice: Subject to any disclaimer, the term of this patent is extended or adjusted under 35 U.S.C. 154(b) by 0 days.

(21) Appl. No.: 09/623,544

(22) PCT Filed: Nov. 10, 1998

(86) PCT No.: PCT/IT98/00312

§ 371 Date: Sep. 5, 2000

§ 102(e) Date: Sep. 5, 2000

(87) PCT Pub. No.: WO99/44911

PCT Pub. Date: Sep. 10, 1999

(30) Foreign Application Priority Data

Mar. 5, 1998 (IT) .......................................... M198A0448

(51) Int. Cl.[7] .............................................. B23P 23/00
(52) U.S. Cl. ....................... 29/33 R; 29/469; 29/564.7
(58) Field of Search .............................. 29/33 K, 33 R, 29/460, 469, 897.3, 563, 564, 564.7

(56) References Cited

U.S. PATENT DOCUMENTS 5,092,024 A * 3/1992 McGarvey ................... 29/460
5,809,650 A * 9/1998 Reese ......................... 29/897.3

FOREIGN PATENT DOCUMENTS

| DE | 3039635 | | 7/1981 | |
| EP | 0604371 | | 6/1994 | |
| JP | 57099428 | * | 6/1982 | .................. 29/469 |

OTHER PUBLICATIONS

PCT International Search Report Date Feb. 2, 1999.

* cited by examiner

*Primary Examiner*—William Briggs
(74) *Attorney, Agent, or Firm*—Hedman & Costigan, P.C.

(57) ABSTRACT

A system (1) for making and assembling a cistern comprises means for locating, cutting, driving, welding, bending, drilling and assembling the component parts of said cistern, wherein said system sequentially provides said locating and cutting means in a first and second stations (2, 3), for arranging, under an automatic control, the metal components (18, 19) of an outer cage (20) of said cistern on said automatized driving means, which are operatively coupled to said automatized welding, cutting, bending and drilling means which, under an automatic control, complete the making of the metal cage encompassing the cistern and then send it to said assembling means which under automatic control, complete the making of the cistern by assembling a pallet (15), a tank and said cage, each of said automatized means being jointly controlled by a central control unit.

11 Claims, 6 Drawing Sheets

SYSTEM AND METHOD FOR MAKING CISTERNS

BACKGROUND OF THE INVENTION

The present invention relates to a system for making and assembling cisterns.

As is known, cisterns are at present broadly used for holding or carrying lipids having very different physical-chemical characteristics, such as alimentary liquids and special liquids for preset industrial applications.

The above mentioned cisterns, to be used for holding or carrying said liquids, must meet given operating parameters, allowing to preserve their efficiency and integrity under all the provided use condition.

Thus, high quality standard are required in controlling and monitoring each made cistern in order to verify that each said cistern meets the set requirements.

At present the mentioned cisterns conventionally comprise a plastic material tank having the bottom thereof anchored to a pallet, in turn made of a metal alloy, wood or plastic material, said cistern being encompassed by a metal cage, anchored to said pallet, which latter operates as a structural supporting element.

For making the mentioned metal cage, steel pipes are conventionally used, said steel pipes being welded to one another and then subjected to a bending operation.

At present, the above mentioned cisterns are made in scarcely automatized systems, in which the delicate welding and monitoring steps are performed manually.

In said systems, substantially manually controlled apparatus carry out the cutting, welding and bending operations on the metal cages, whereas, simultaneously, the pallets are made, for example, by plastic material molding apparatus, or are assembled starting from metal or wood parts. The plastic tanks, which can be separately constructed, are then brought to the end assembling zone, where they are manually assembled.

The disclosed prior systems, while solving the indicated technical problem, are affected by the following disadvantages.

Said prior systems, which comprise manually controlled apparatus, require very high operating times for making said cisterns, both because of practical requirements associated with the making mode of operation thereof, and since the quality controls on the finished product are, as stated, performed manually.

In particular, the manually performed welding operations require a lot of labour, thereby unavoidably increasing the cost of the product.

Moreover, the end product does not present consistent mechanical characteristics, since the controls performed in the above mentioned prior systems are actually carried out by skilled operators, instead of using automatized calculation and measurement systems.

The above mentioned prior systems, moreover, can be hardly automatized, because of the tubular construction used therein for making the metal cage of the cisterns, which tubular construction can not be automatically easily processed, in particular because of a lot of problems related to the welded part strength.

SUMMARY OF THE INVENTION

Accordingly, the aim of the present invention is to overcome the mentioned drawbacks of the prior art.

Thus, the invention relates to a system for making an assembling cisterns, allowing to make said cisterns in a fully automatic manner, starting from semifinished articles of manufacture, thereby reducing the making time and cost, and drastically improving the quality controls on the finished product.

Briefly, for achieving the above mentioned aim, as well as yet other objects, which will become more apparent hereinafter, the invention provides a system for making and assembling a cistern, comprising means for locating, cutting, driving, welding, bending, drilling and assembling the component parts of said cistern, wherein said system provides sequentially said locating and cutting means in a first and second stations, for arranging, under an automatic control, the metal components of an outer cage of the cistern on said automatized driving means, which are operatively coupled to said automatized welding, cutting and bending and drilling means, which, as automatically controlled, complete the making of the metal cage encompassing the cistern, and then convey it to the mentioned assembling means which, as automatically controlled, complete the making of the cistern by assembling a pallet, a tank and said cage, wherein each of said automatized means is jointly controlled by a central control unit.

The system for making and assembling cisterns according to the invention is characterized by the characteristics claimed in claim 1.

The system for making and assembling cisterns according to the invention provides the following advantages.

Each individual operating step is automatized and controlled, with obvious advantages related to the operating-yield and the finished product quality.

Consequently, the finished product will have an overall less cost, both due to the savings in labour and the product control quality, meeting the standard requirements provided by the enforcing standardizing rules.

More specifically, said controls will be very practical and advantageous with respect to the weldings performed during the making cycle, which have been very critical in prior art methods.

BRIEF DESCRIPTION OF THE DRAWINGS

Further characteristics, advantages and constructional details of the system for making and assembling cisterns according to the invention, will become more apparent hereinafter from the following disclosure, with reference to the accompanying drawings, in which a preferred embodiment of the invention is shown by way of an indicative but not limitative example.

In the drawings:

FIG. 9 is a side view of said metal cage mounted on a pallet; and.

DESCRIPTION OF THE PREFERRED EMBODIMENTS

With reference to the number references of the above disclosed figures, the system 1 for making and assembling cisterns according to the invention advantageously comprises a plurality of automatized stations.

Said cisterns substantially comprise a pallet 15, a metal cage 20 and a tank, the latter being preferably made of a plastic material.

Figure 1:
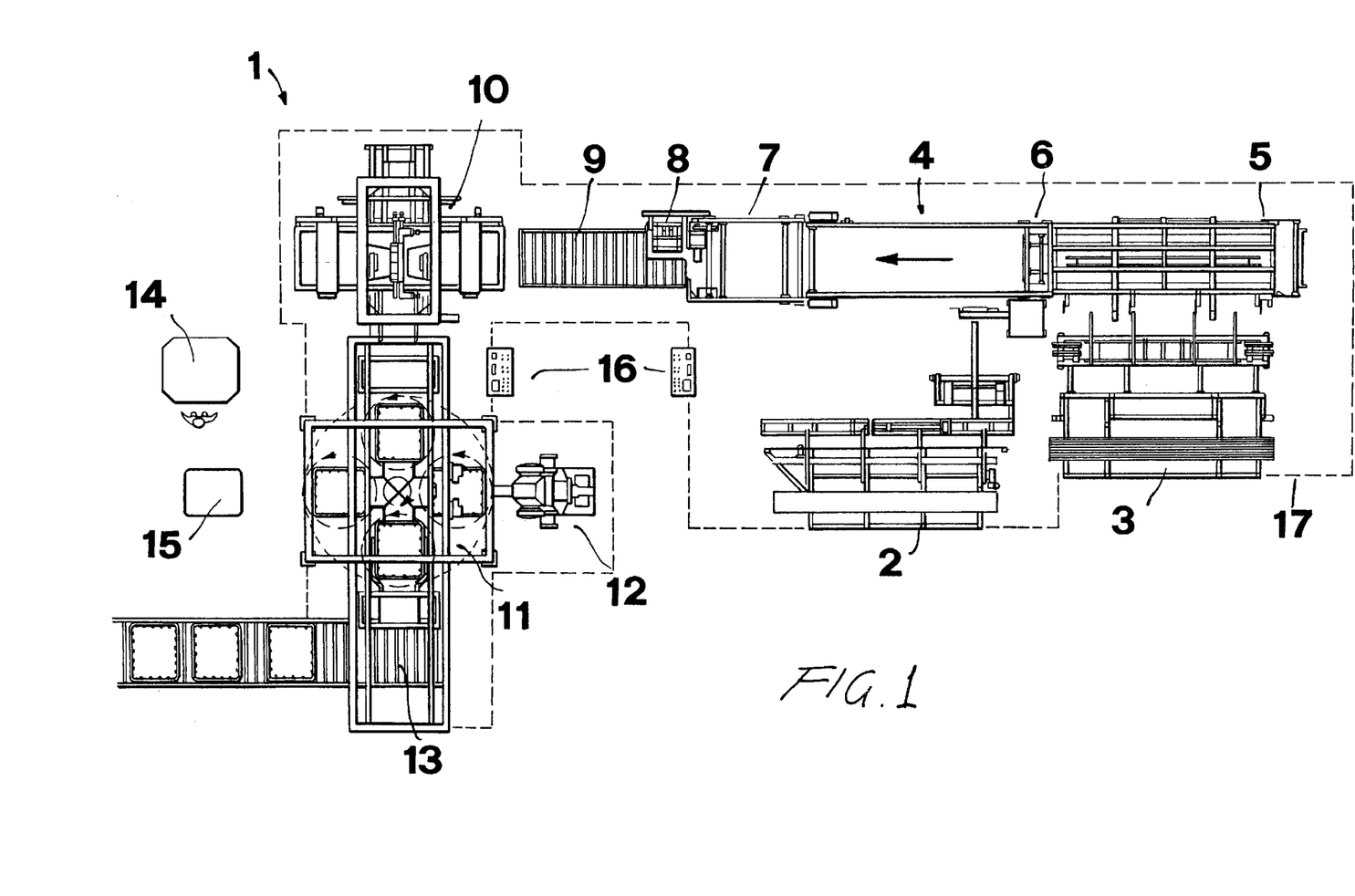
FIG. 1 is a top plan view of the arrangement or lay-out of the system for making an assembling cisterns according to the invention.

Said system 1 provides for making the finished cisterns on separated making lines, for assembling the aforesaid components, to form said finished cistern.

The making of the cage 20 starts from two cutting stations 2, 3. More specifically, at a cutting station 2, the tubes or poles 19 for forming the vertical framework of the cage 20 are cut to the provided size and plastically deformed at the end portions thereof.

Figure 2:
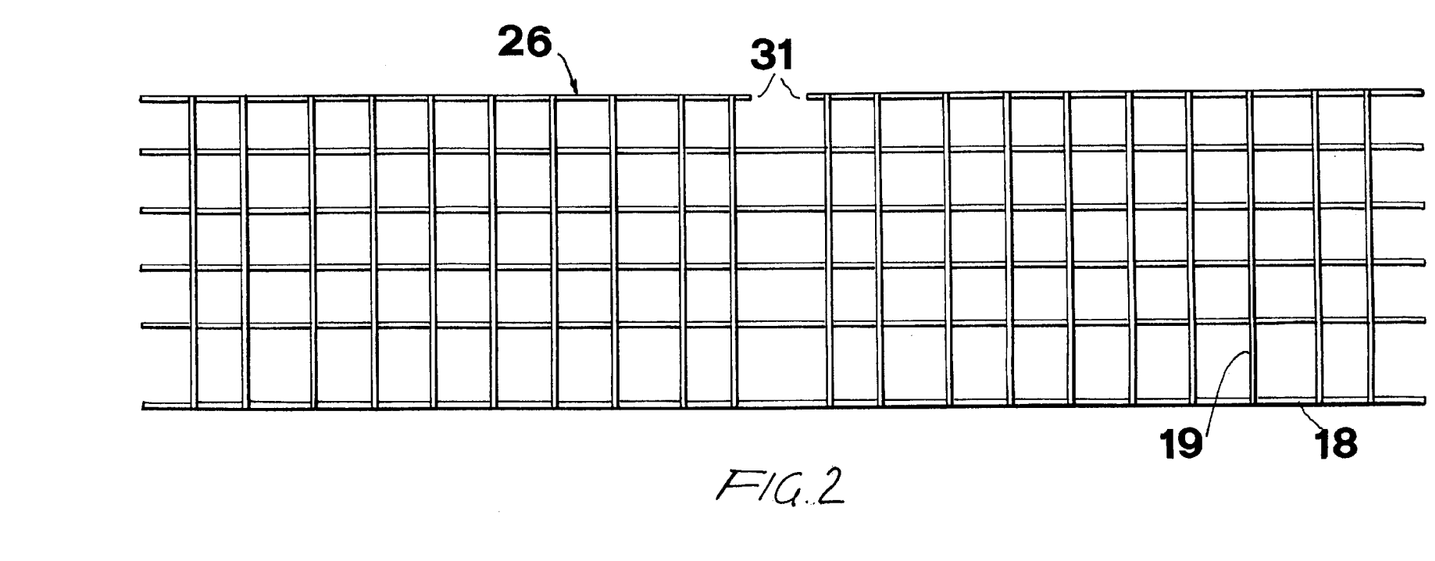
FIG. 2 is a, top plan view of the, component elements forming a cage of said cistern, as arranged on said driving means of the inventive system.

Advantageously, said poles 19 are made of a steel material, are hollow and have a square contour, the corners of which can be assimilated to four cusps. This contour will provide a slight concavity in the four side faces, as it will be disclosed in a more detailed manner hereinafter, said concavity being specifically designed for providing a good welding tightness with the horizontal tubes or bars 18.

Figure 4:
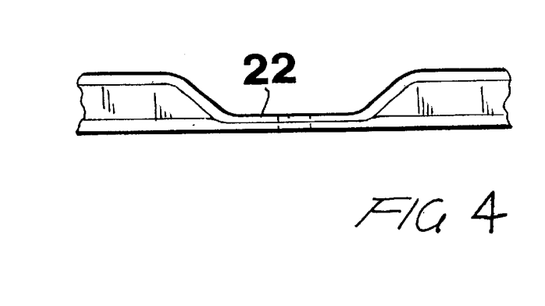
FIG. 4 is a side view of an element of said metal cage being plastically deformed.

The plastic deformation at the end portions of the poles 19 is carried out, in particular, for sealing said tubes, in order to prevent waste materials and the like from accumulating inside said tubes.

The cutting station 3 is provided moreover for orienting and cutting the tubes or bars 18 for forming the horizontal framework of the cage 20.

Said tubes or bars 18 are also of hollow construction, are made of a steel material and have a square cross-section. In this case, however, the cusps present at the four corners are so designed as to provide a non symmetrical contour or profile: in particular, said cusps define two flat opposite side faces, whereas the remaining faces will be slightly concave.

As it will be disclosed hereinafter, this specifically designed pattern would be very useful during the welding step.

Finally, the station 3 is also designed, line said station 2, to carry out a plastic deforming operation on the bars 18, and, in particular, said bars are pressed or crushed at the end portions thereof opposite to the portion thereof being cut.

In this case, however, the performed plastic deformation is provided for making the mechanical connection necessary to form, as it will be furthermore disclosed, a closed horizontal framework for said cage 20.

The cutting stations 2 and 3 are operatively connected to a locating unit and, more specifically, the pole cutting station 2 is coupled to the pole locating unit 6, whereas the bar cutting station 3 is coupled to the bar locating unit 5.

Said locating units 5, 6 are adapted to load the bars 18 and poles 19 on a driving unit 4, and, in particular, the locating unit 5 is provided for locating the bars 18 and is arranged upstream of the driving unit 4, whereas the driving unit 6 is provided for arranging the poles 19 and is arranged downstream of the preceding unit.

Advantageously, two buffer systems are provided for allowing the bars 18 and poles 19 to be continuously supplied to that template assembly which, at this time, is arranged, by the driving unit 4, at a position suitable for loading, even if a failure is locking one of the two cutting stations 2, More specifically, six bars 18 and twenty five poles 19 are preloaded on the locating units 5, 6 which will provide the system with an operating autonomy corresponding to a full cage 20, in a case of a shut-off or failure condition of the mentioned stations 2, 3.

Figure 5:
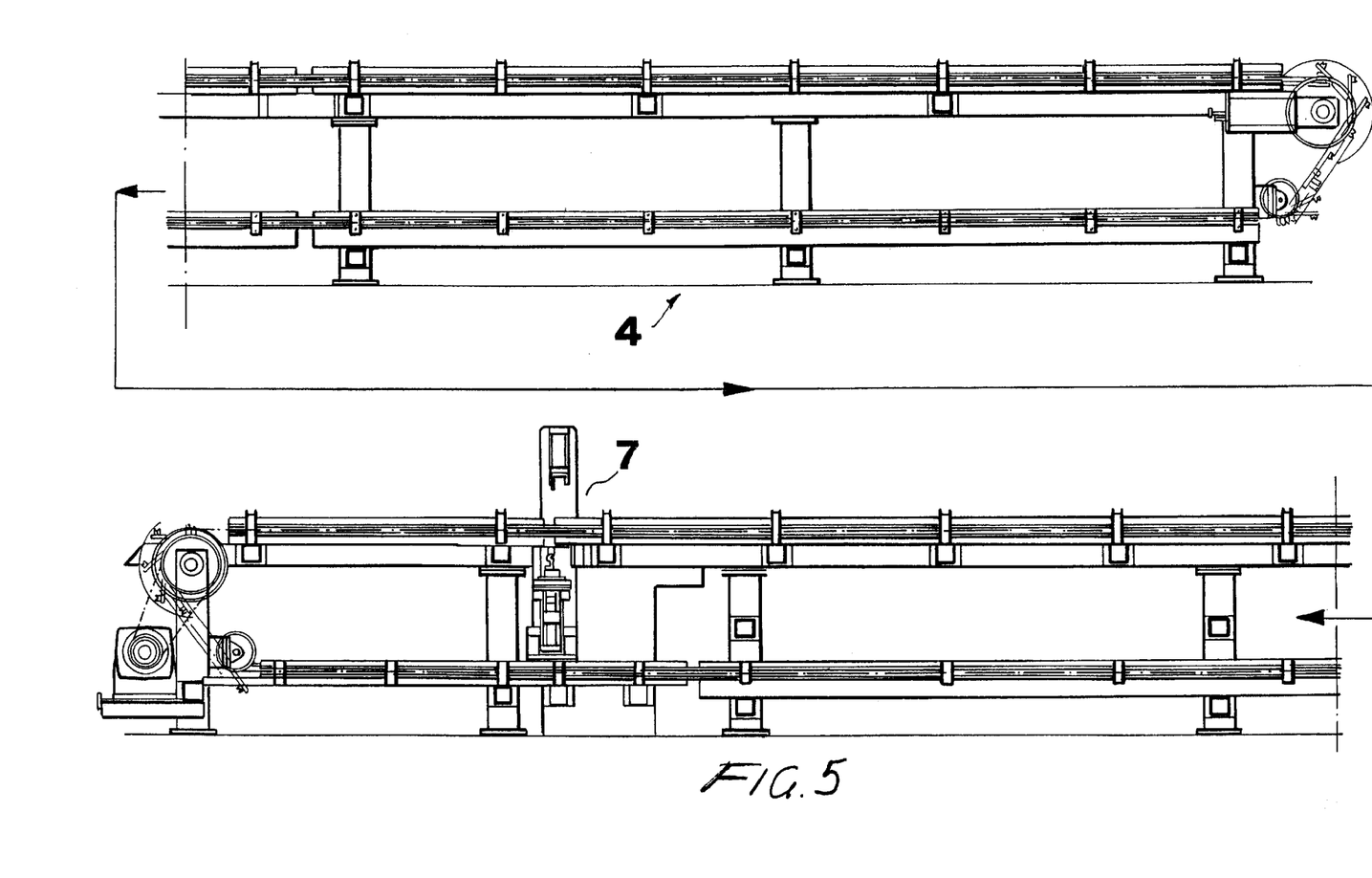
FIG. 5 is a further side view of driving means included in the system according to the invention.

The driving unit 4 essentially comprises a conveyor belt on which five templates arranged for receiving the bars 18 and poles 19 are driven. In particular, each time a template will be arranged in a loading condition, i.e. with a template near a welding station 7, with another template under an unloading condition, and two further templates in an empty return condition.

All of the above disclosed units, as well as the hereinafter disclosed ones, are automatically controlled in an integrated manner by a control line 17, which ends at at least two control panels 16, where all of the operating parameters of the inventive system 1 are preset.

As stated, the driving unit 4 drives the template thereon the bars 18 and poles 19 are loaded to the welding station 7, where the bars and poles are resistance welded to one another.

On each template the bars 18 and poles 19 are arranged in a grid patterns 26, and, in particular, the longer bars 18 are arranged parallel to the template movement direction, whereas the shorter poles 19 are transversely arranged in said direction.

Advantageously, the above disclosed specifically designed profiles of the bars 18 and poles 19 will form four contact points for each bar-pole crossing, said contact points being particularly suitable for connection by said resistance welding operation. More specifically, the flat faces of the bar 18 are arranged perpendicular to the poles 19.

Figure 6:
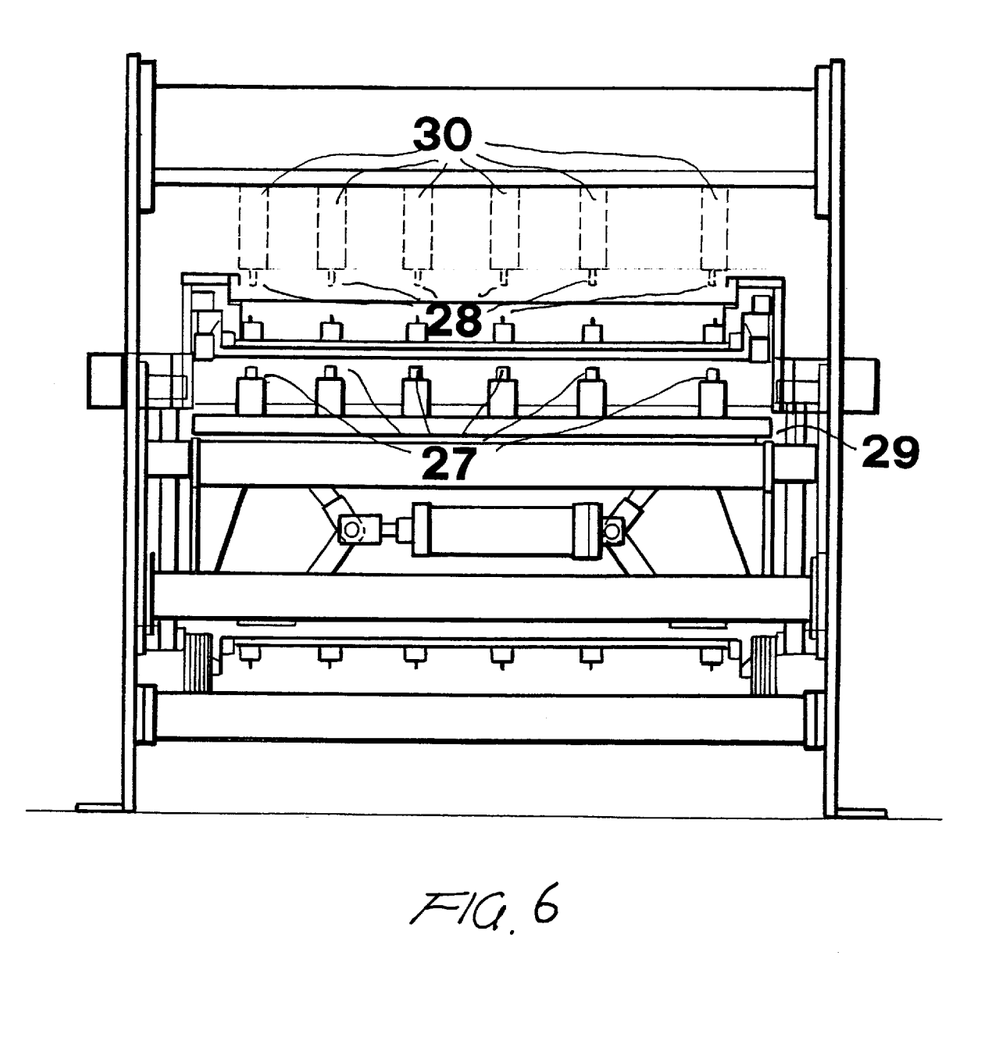
FIG. 6 is a cross-sectional view of the driving means near the welding means included in the system according to the invention.

The welding station 7 is advantageously provided with a bottom cross-member 29, bearing the counter-electrodes 27, while allowing the latter to be vertically displaced, whereas, on the top of the grid 26 to be welded, six pneumatic cylinders 30 bearing at their end portions corresponding six electrodes 28 are provided.

The welding station 7 comprises moreover an automatic control system for automatically controlling the welding step, the operation of said automatic control system being disclosed hereinafter in a more detailed manner.

Downstream of the welding station 9 is arranged a cutting station 8, which forms a gap 31 along that side bar provided for forming, after a suitable bending operation, the base ring element 21 of the cage 20.

Downstream of the cutting station 8 is arranged a motorized or driven roller assembly 9, which is operatively connected to a bending and drilling station 10, for completing the cage 28, and locating the completed cage for coupling with the other components of the cistern, such as a pallet 15 and a tank, said tank being advantageously made of a plastic material.

As shown, downstream of the bending and drilling station 10, a carousel 11 is provided, said carousel being designed for contemporaneously supporting four pallets 15 in order to arrange corresponding cages 20 thereon.

Said pallets 15 are made in a suitable pallet making station 14, and they can be of wood, a metal material or a plastic material.

As made, said pallets are loaded by an operator on the mentioned carousel 11.

As shown, the carousel 11 is provided with four cross-like seats for receiving thereon said pallets 15, which can be individually rotated, and, moreover, the overall carousel 11 can also rotate about a rotary axis thereof. These two combined rotations would be particularly useful for presenting each side of the cistern being assembled to an anthropomorphic robot 12, of a prior known type, including a screwing or threading head.

Downstream of the carousel 11, a unloading handler will bring off line the pallet 15 and cage 20 assembly.

In particular, a suitable gravity roller assembly 13, advantageously arranged according to the lay-out of the system 1, will bring said assembly to a further assembling area (not shown), where a suitable tank will be loaded from the top inside the cage 20, and being fixedly connected to said cage by two horizontal cross members.

In this connection, it should be apparent that the shape and size of the several elements constituting the subject system for making and assembling cisterns, can vary according to requirements, without departing from the scope of the present invention.

The operation of the system 1 can be easily deduced from the preceding disclosure.

A bar 18 and pole 19 assembly is loaded, by the operators, on the cutting stations 2, 3. Another operator, by means of one of the control panels 16, will program the operation of the making cycle, and will cause the making cycle to start.

Then, the bars 18 are cut, oriented and plastically deformed at one end portion thereof, before arriving at the preloading region which will receive the first six bars and then the template driven at that time by the driving unit 4 to the loading position.

Likewise, the poles 19 are cut and cold deformed at their end portions: the thus made deformed surface 25 will allow said poles 19 to be sealed. For the poles 19, the preloading region, operating as a buffer region, will hold twenty five pole elements, and, as said region is full, the subsequent poles will be arranged on the same template. In particular, the poles 19 are arranged above the bars 18 already loaded on the template.

Thus, the driving unit 4 will bring the thus loaded template to the welding station 7 where, at each bar-pole crossing an automatic resistance welding operation is performed, from the inside of the grid 26 toward the outside thereof, thereby providing four welding points at each crossing.

Upon weldment of each bar-pole crossing, the electrodes 27, 28 will supply a test current to verify the proper welding condition. In particular, the welded spots must have a preset resistance value to the current flow, and as the measured resistance value is included within a given volume range, it will provide the central control system with information indicating a good welding operation; on the contrary, if the welded spots are detected as unsatisfactory, then the grid 26 will be ejected by the motorized roller assembly 9.

Then, the welded grid will be conveyed through the cutting station 10 for providing the above mentioned gap 31.

With respect to the movement of the grid 26 on the template driven by the driving unit 4, it should be pointed out that, for each welding operation carried out on a row of six crossings, a pole 19 will be loaded at a distance of a pitch and, for each unloading operation after the cutting station 10, the bars 18 will be loaded on the template arranged in its loading position.

Thus, the above disclosed condition will occur: in other words, during the return step two templates will be always in an empty condition, with a template under loading, another template under welding, and with yet another template being unloaded.

Figure 7:
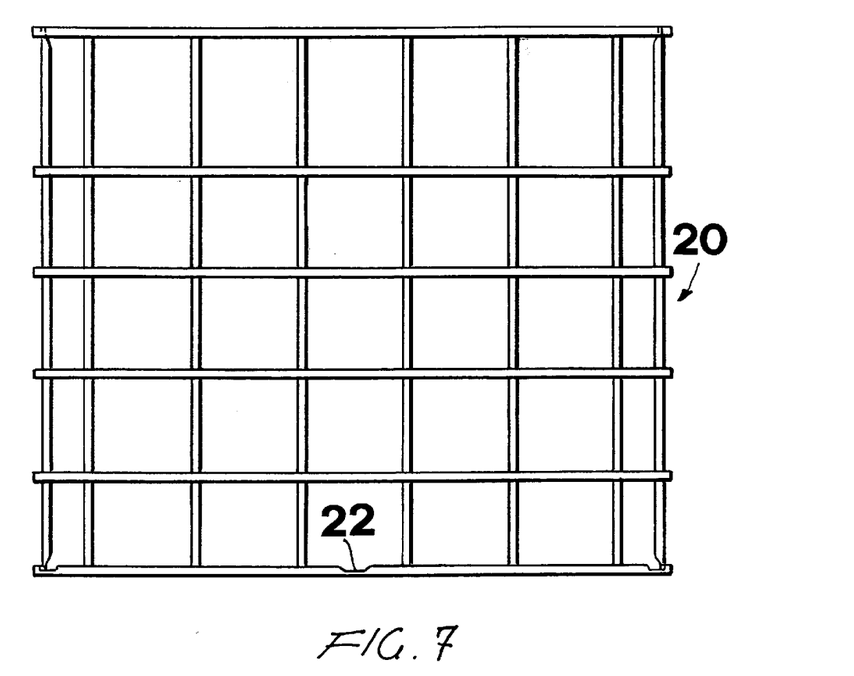
FIG. 7 is a side view of said cage, in a ready condition for its end assembling.

The bending and drilling station 10 will provide the grid 26 with four bends, i.e. a first near each end portion thereof, and other two nearer the central position, to cause the end portions of the bars 18 to contact one another.

Figure 3:
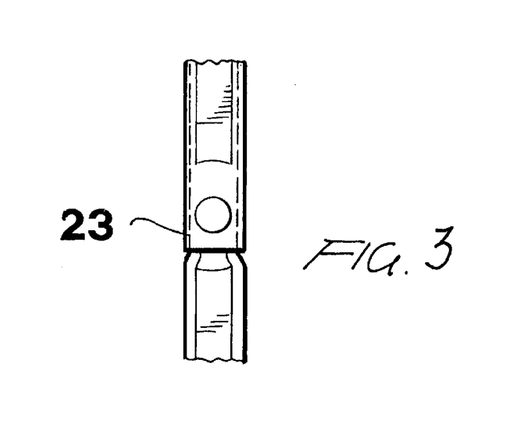
FIG. 3 is a side view of a detail of the plug-in connection of two elements included in said metal cage.

More specifically, in addition to being bent, and before drilling, the end portions of the bars 18 will be automatically coupled to one another, by plastically pre-deforming one of said bars in the cutting station 3 and engaging it in the undeformed end portion. Thus, a fixed joint 23 would be obtained, further strengthened by a subsequent clamping operation.

Figure 8:
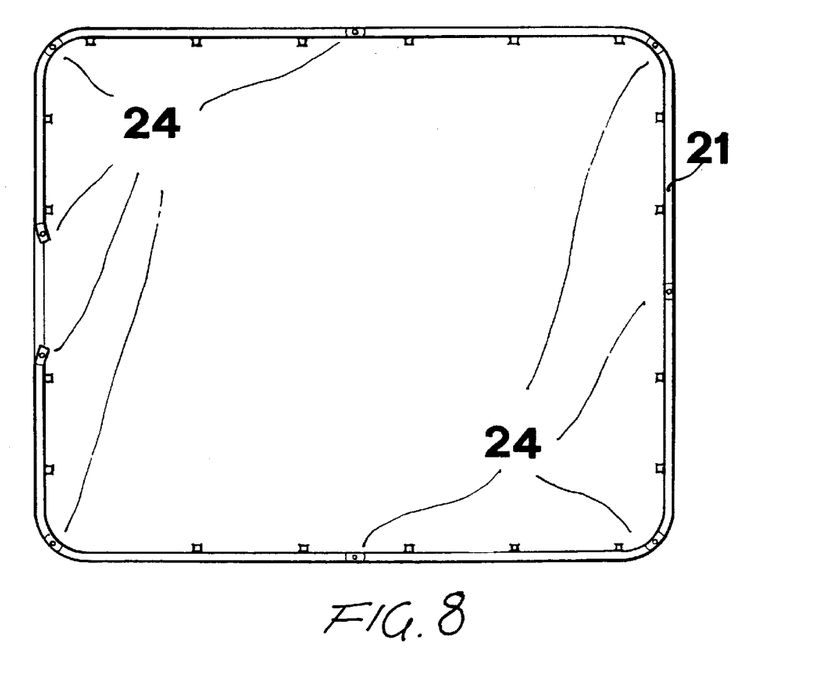
FIG. 8 is a bottom view of said metal cage.
Figure 10:
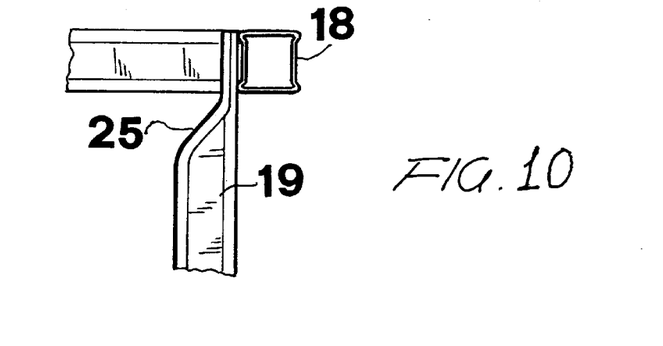
FIG. 10 is a side view of a detail of sad cage which has been subjected to a plastic deformation operation.

Then, a series of plastic deformations are automatically performed on the base ring 21. These plastic deformations will provide a plurality of deformed surfaces 22, where the holes 24 for coupling the pallets 5 to the finished cage 20 will be formed.

Then, the operator will convey a respective pallet 15 from the pallet making station 14, to a respective pallet seat provided on the carousel 11, which will in turn automatically load the cages 20 exiting the bending and drilling station 10.

Figure 9:
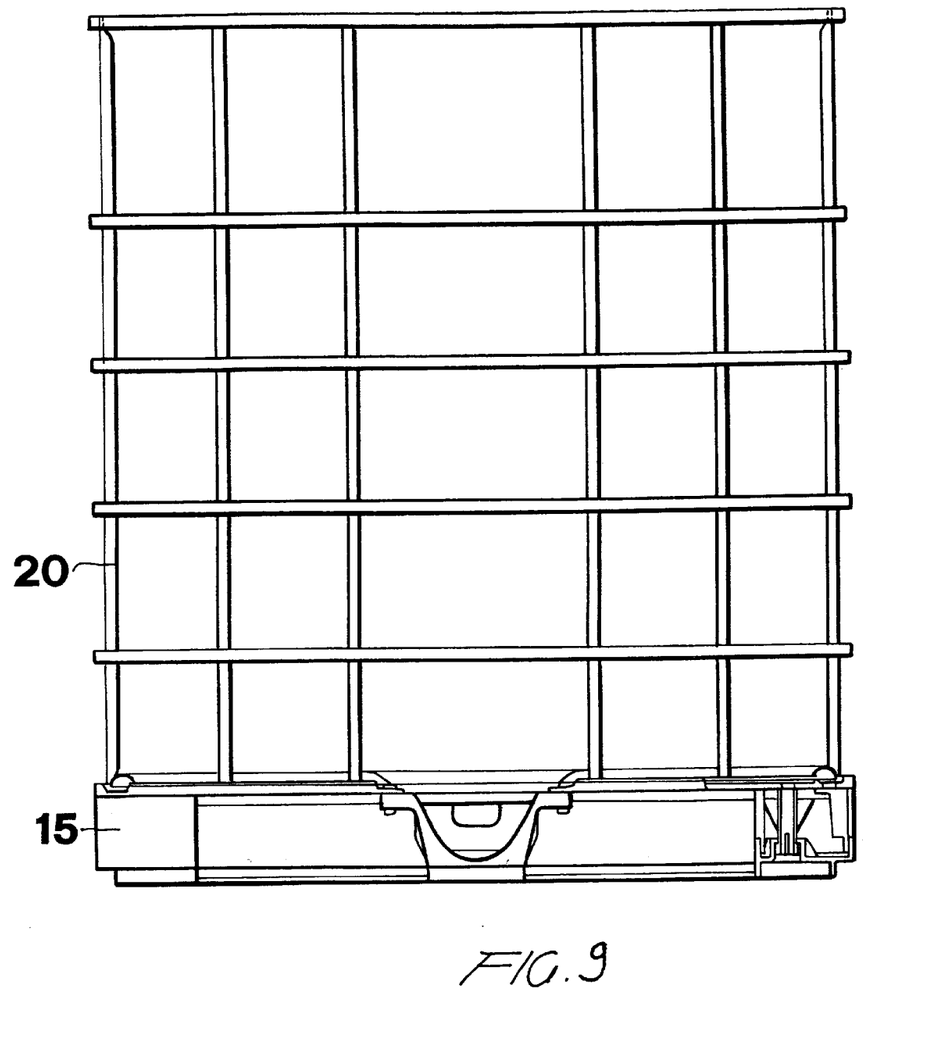

The pallet 15 and cage 20 assembly will then arrive, upon a circular movement of the carousel 10, in front of said robot 12, provided for performing the above mentioned screw application and the likeoperations.

Finally, a unloading handler will arrange the connected cage and pallets on the gravity roller assembly 13 and, in a separated line, a separately made tank will be added, whereas a pair of cross-members arranged on the top of the cage 20 will fixedly connect said tank to the pallet 15-cage 20 assembly, thereby completing the cistern.

What is claimed is:

1. A system for making and assembling cisterns comprising:
  (a) locating means;
  (b) cutting means;
     where said locating and cutting means comprise in sequence a first cutting station and a second cutting station for arranging under an automatic control, metal components of an outer cage;
  (c) driving means;
  (d) welding means;
  (e) bending means;
  (f) drilling means; and
  (g) assembling means for component parts of said cistern;
     where said driving means comprises an automatically controlled driving means jointly coupled to a central control unit and operatively coupled to said locating means, cutting means, driving means, welding means, bending means, drilling means, and assembling means;
  said automatically controlled driving means to complete a metal cage encompassing said cistern and to convey said metal cage to said assembling means;
  wherein said assembling means comprises an automatically controlled assembling means;
  said automatically controlled assembling means to complete said cistern by assembling a pallet, a tank and said metal cage.

2. A system according to claim 1, wherein metal components of said cage comprise bars and hollow poles having a substantially square cross-section, said bars being automatically processed in said cutting stations in which said bars are subjected to orienting, cutting and plastic deforming operations; and being then supplied by a bar locating unit, to said driving means above said bars and perpendicular to said bars, thereby providing a grid including horizontal elements comprising said bars and vertical elements comprising said poles.

3. A system according to the claim 1, wherein said automatic driving means further includes:

a driving unit comprising a conveyer belt for driving five templates; said driving unit thereby arranging a template under a loading step for loading said grid, arranging a second template proximal to said welding means, arranging a third template under an unloading step for unloading said grid, and arranging a fourth and a fifth template under a return step.

4. A system according to claim 2 having a pair of buffer systems positioned between the locating unit and driving unit for receiving a plurality of bars and poles, wherein said buffer systems provide said system with production autonomy of at least a cage during malfunction of one of said first and second cutting stations.

5. A system according to claim 3, wherein said welding means comprises an automatically controlled resistance welding station wherein a cross-member, arranged under a driving level of said templates, supports a plurality of vertically movable counter-electrodes and a corresponding plurality of pneumatic cylinders supporting said plurality of electrodes, said electrodes supplying a current necessary for welding and a current necessary for testing a welding operation.

6. A system according to claim 5, wherein said cutting means are arranged downstream of said welding station, said cutting means comprising a cutting station provided for forming a perimetrical gap on an outer bar of said grid, provided for forming, after passing through said bending means, a bottom base of a cage, said cutting station being operatively coupled to a motorized roller assembly, for conveying a welded grid to said bending and drilling means.

7. A system according to claim 1, wherein said bending and drilling means comprise an automatically controlled bending and drilling station, which, through a plurality of bending, drilling and plastic deformation operations, provides, starting from a welded grid, a cage having bars forming horizontal elements and poles forming vertical elements, said cage being automatically supplied to said assembly means thereto.

8. A system according to claim 1, wherein said assembling means comprise a rotary carousel and an anthropomorphic robot having a screwing on head, said rotary carousel including a plurality of seats for housing at the bottom of said pallets, on which are automatically arranged said cages; wherein the rotary movement of said carousel automatically loads said cages on said pallets, further driving said cages in front of said robot for performing a screwing on operation, and automatically unloads said cages through an outer handler, said outer handler unloading onto a gravity roller assembly, a pallet-cage assembly upon coupling said pallet and cage.

9. A system according to claim 1, wherein said pallets are made of materials selected from the group consisting of wood, metal and plastic, in an automatic pallet making station, separated from a cage making line.

10. A system according to claim 8, wherein said gravity roller assembly conveys, at an outlet of said rotary carousel, a pallet-cage assembly to a last assembling station, where an already made tank is arranged inside said cage and fixed thereon by a plurality of connecting crossmembers.

11. A system according to claim 1, wherein said system comprises a control line, coupled to a plurality of control panels to control an automatic operation of all said means of said system.

* * * * *